United States Patent
Joory et al.

(10) Patent No.: US 11,971,174 B2
(45) Date of Patent: Apr. 30, 2024

(54) FASTENING FOR A TURBOMACHINE COMBUSTION CHAMBER

(71) Applicant: SAFRAN AIRCRAFT ENGINES, Paris (FR)

(72) Inventors: Dan-Ranjiv Joory, Moissy-Cramayel (FR); Jacques Marcel Arthur Bunel, Moissy-Cramayel (FR); Benjamin Frantz Karl Villenave, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 64 days.

(21) Appl. No.: 17/610,893

(22) PCT Filed: May 14, 2020

(86) PCT No.: PCT/FR2020/050805
§ 371 (c)(1),
(2) Date: Nov. 12, 2021

(87) PCT Pub. No.: WO2020/229781
PCT Pub. Date: Nov. 19, 2020

(65) Prior Publication Data
US 2022/0196243 A1 Jun. 23, 2022

(30) Foreign Application Priority Data
May 14, 2019 (FR) ..................... 1904986

(51) Int. Cl.
*F23R 3/50* (2006.01)

(52) U.S. Cl.
CPC ...... *F23R 3/50* (2013.01); *F23R 2900/00017* (2013.01)

(58) Field of Classification Search
CPC .... F23R 3/60; F23R 3/50; F23R 3/007; F23R 2900/00017; F05D 2250/241; F05D 2250/40–43; F05D 2250/711
See application file for complete search history.

(56) References Cited

U.S. PATENT DOCUMENTS 5,524,430 A * 6/1996 Mazeaud ............... F23R 3/42
60/752
8,028,530 B2 * 10/2011 Commaret ............ F02C 3/14
60/797

(Continued)

FOREIGN PATENT DOCUMENTS

FR 2 465 080 A1 3/1981
FR 3 020 865 B1 5/2016

OTHER PUBLICATIONS

International Search Report dated Sep. 10, 2020, issued in corresponding International Application No. PCT/FR2020/050805, filed May 14, 2020, 5 pages.

(Continued)

*Primary Examiner* — Jason H Duger
(74) *Attorney, Agent, or Firm* — CHRISTENSEN O'CONNOR JOHNSON KINDNESS PLLC

(57) ABSTRACT

A turbomachine has the upstream portion of the annular combustion chamber is fixed to the outer housing via individual pins with a swivel connection.
The swivel connection is established between the pin and a part of the outer housing.
The pin is slidable radially, or with a radial component, by a slide established between the pin and a tubular part of the outer annular shroud and/or the annular wall of the chamber bottom.

9 Claims, 4 Drawing Sheets

(56) References Cited

U.S. PATENT DOCUMENTS

2005/0016182 A1* 1/2005 Morenko .................. F23R 3/50
                                                                                60/800
2016/0003192 A1* 1/2016 Roberge .................... F02C 7/18
                                                                                60/782
2016/0169513 A1    6/2016 Sobol et al.

OTHER PUBLICATIONS

Written Opinion dated Sep. 10, 2020, issued in corresponding International Application No. PCT/FR2020/050805, filed May 14, 2020, 6 pages.
English translation of Written Opinion dated Sep. 10, 2020, issued in corresponding International Application No. PCT/FR2020/050805, filed May 14, 2020, 5 pages.
International Preliminary Report on Patentability dated Nov. 16, 2021, issued in corresponding International Application No. PCT/FR2020/050805, filed May 14, 2020, 7 pages.

* cited by examiner

FASTENING FOR A TURBOMACHINE COMBUSTION CHAMBER

FIELD OF THE DISCLOSURE

The present disclosure relates to a turbomachine with an annular combustion chamber. A gas turbomachine for aircraft is particularly targeted.

BACKGROUND

From FR3020865B, such a turbomachine is known having an axis and comprising an outer housing and an annular combustion chamber comprising two annular shrouds (called annular rings, as well), respectively inner and outer radially with respect to the axis of the turbomachine. The shrouds or rings are arranged one inside the other and connected at their respective upstream ends by annular wall of a chamber bottom, called chamber end as well. The annular combustion chamber is attached upstream, to an outer housing of the turbomachine, via individual pins with a swivel connection (i.e., fitted with a swivel).

In FR3020865B, the solution to the problem involves the upstream end of at least one of the inner and outer shrouds being centred by radial support on the annular wall of the chamber bottom and cooperating by sliding axially in a sealed manner therewith.

But it is considered here that the following problems in particular remain:
- ability to manufacture without excessive stress: complex machining because, per pin, a non-right-angle angulation between a fastening plate and the direction of elongation of the pin may have to be given to each pin with a swivel connection, for its inclined operational positioning with respect to a radial,
- difficulty in correctly positioning the combustion chamber in its environment: integration with the spark plug with which It is further equipped, the fuel injectors in the combustion chamber and the connections to the downstream ends of the shrouds (typically sealing lamellae),
- maintenance: significant wear of certain areas of the swivel connection pins, opening the clearances between the outer housing and the combustion chamber, resulting in possible axial displacement of the combustion chamber in operation and the need for regular replacement of parts,
- almost no room for manoeuvre when mounting the combustion chamber in the turbomachine, resulting in practical difficulties, including local pre-stressing.

It is specified that, in the present text, "axial" means either along the axis (hereinafter 30 or X, of the turbomachine), or parallel to it, and radial means (substantially) transversal to this axis conventional axis Z. Exterior and interior are appreciated radially.

SUMMARY

To provide a solution to at least part of these problems, it is proposed, on the aircraft gas turbomachine presented above in connection with FR3020865 and at the upstream fastening part:
- that the swivel connection be established between the pin and a part of the outer housing in which a convex wall of the pin is received, and
- that a sliding connection be further established, apart from the swivel connection, between the pin and a part:
  - of the outer annular shroud, and/or
  - of the annular wall of the chamber bottom.

As the expression "apart from the swivel connection" implies, the sliding connection is present at a distance, or in other words, away from the swivel connection: the sliding connection referred to above is preferably located at an end of the pin opposite to that where the swivel connection is located.

Situated in a space, the swivel connection will usefully be established, or located, in a cavity in the outer housing, or, as hereinafter detailed, in a part (such as a plug) fitted to the outer housing.

Thus, if one compares the solution of the disclosure with the teaching of FR 2465080, the setups are the reverse; in the solution of FR 2465080 and in the conventional manner:
- the swivel connection is on the side of the shroud 2 shown in FR 2465080, not on the side of the housing 4 of this document, and
- there is no sliding connection furthermore established (i.e. apart from the swivel connection) between the pin 9 of this document FR 2465080 and a part 6 of the outer annular shroud and/or the annular wall of the chamber bottom.

With the solution of the disclosure, it is necessary to gain assembly clearance and/or operational clearance with the turbomachine in operation.

A sliding connection oriented for radial sliding (along the Z axis) is suitable.

In this regard, it is in fact proposed, preferably, that the part through which the sliding connection of the pin is established is a radially extending tubular part (Z axis), or with a radial component.

A tubular shape is simple to manufacture, and its (inner) passageway can effectively fulfil a sliding connection role. It can be easily and reliably fixed, or even made in one piece with the outer annular shroud or the annular wall of the chamber bottom, or both (screwing, welding, etc.).

The expression "radial component" means that the element concerned does not extend strictly radially, but that its direction of extension can be broken down along the X and Z axes, as is the case for the angle $\alpha$ below (oblique orientation; see FIG. 3). It is moreover also proposed, preferably:
- that each pin have a shaft between a first end where the swivel connection is located, established in the part of the outer housing, and a second end where, for possible sliding, the pin is in sliding contact along an axis with the tubular part, and
- that the shaft is oriented obliquely with respect to the axis of sliding contact.

Thus, with the help of a tool, it will be possible to play angularly on the positioning of the chamber in order to control the clearances (spark plug, fuel injectors, connections to the downstream ends of the rings).

Positioning the swivel connection at the first end of the shaft—on the outer housing side—will make it possible to limit the above-mentioned clearances, to limit the effects of friction and to optimize the positioning to be carried out.

It may be preferable for the axis of the above-mentioned sliding contact to be radial, which makes it easier to manufacture and provides a positioning reference that is easier to control and therefore more operational.

It is also proposed that, preferably, the part with which the possible radial sliding is established, or with a radial component, comprises a radially erected channel, with the same effect as above.

It is also proposed that, preferably, this channel is erected radially on the annular wall of the chamber bottom.

Thus, by choosing such a structural part and favourably a most structural area of it, the fastening to be made will be stabilized.

In order to facilitate the movements to be carried out and its realization, it is further proposed that the aforementioned swivel connection comprises a connection between a convex wall and a cylindrical wall.

Preferably, the cylindrical wall will be a wall of a plug attached to the outer housing.

Replacing such a plug should be relatively simple, and, if the swivel connection is located at the first end of the shaft, thus on the outer housing side and not on the combustion chamber side, and if the shaft of each pin is offset (extends at an angle) with respect to the axis of the sliding contact, the assemblies will be optimized and the possibility, with the aid of a tool, of angularly playing on the positioning of the combustion chamber to control the clearances and the reduction of the aforementioned wear.

It should also be noted, in connection with the above-mentioned problems, that there is the advantage of an assembly such that, in the upstream part, the pins, which will be at least three, are distributed circumferentially around the combustion chamber and can individually, by means of the swivel connection and the possible sliding, have an angular orientation different from that of the others, each in relation to a radial axis, according to a plane passing through the axis of the turbo machine.

The disclosure will be better understood and other details, characteristics and advantages of the disclosure will appear when reading the following description, which is given as a non-limiting example, with reference to the attached drawings.

In terms of advantages to the solution of the disclosure considered with all or some of the foregoing features, it will be further noted:
that the sliding part will reduce the wear with the tubular part, turbomachine in operation,
a gain of mass related to the replacement:
of what is typically provided for in the prior art (see FIG. 2: digon plate 60 and screw),
by the part (marked 86 below) of the outer housing with which the swivel connection is established (and which may therefore be a threaded plug).

DETAILED DESCRIPTION

Figure 1:
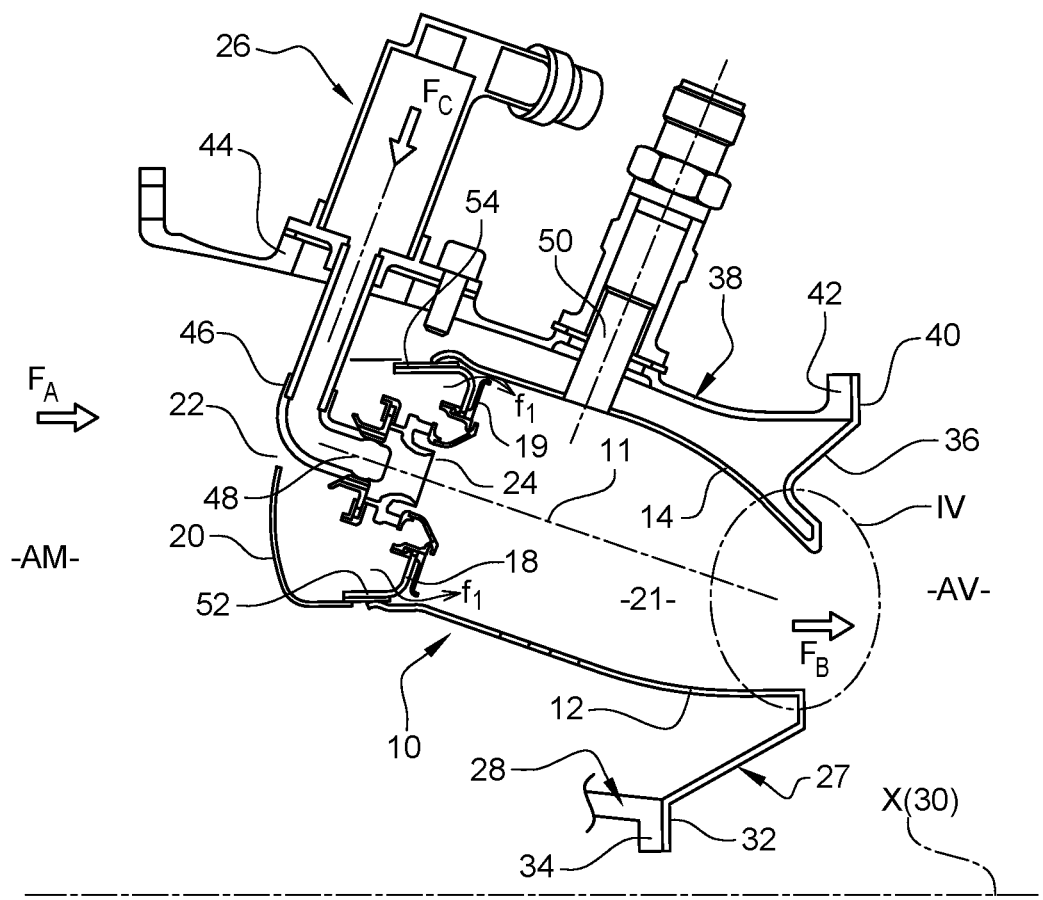
FIG. 1 is a schematic mid-section view of a combustion chamber which may be according to the disclosure.
Figure 2:
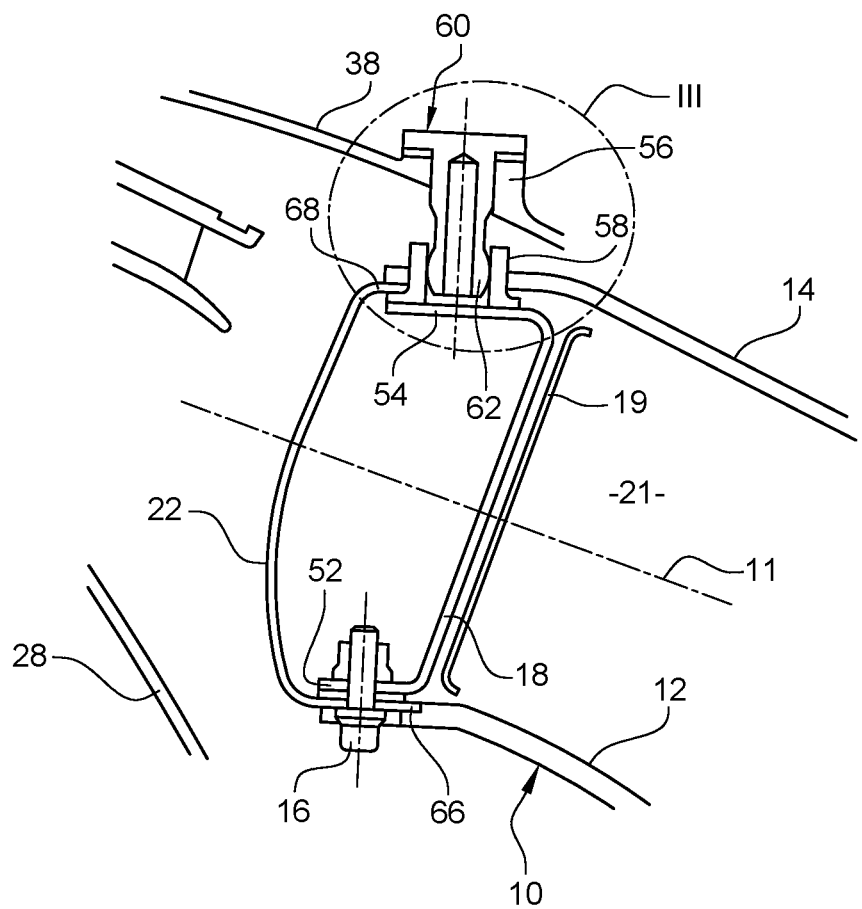
FIG. 2 is a schematic cross-sectional view of an upstream end of a combustion chamber according to the prior art, along an axial sectional plane passing through fastening members of this upstream end.

In the prior art solution of FIGS. 1-2, the combustion chamber 10, with an axis 11 of elongation, receives an air flow FA, from upstream, (AM) and a fuel flow FC. The burnt gases FB leave it towards the downstream (AV), where they are directed towards a turbine, such as the turbine 121, here high pressure (see FIG. 4), and first towards a turbine nozzle 123 which is a part of the stator of the turbomachine.

The combustion chamber 10 comprises two coaxial inner 12 and outer 14 annular shrouds, attached at their upstream ends to a more rigid annular wall of the chamber bottom 18. The chamber bottom wall 18 extends transversely to the axis 11. In parallel, just in front of it (just downstream), there is a thermal screen or flame barrier 19. Air that has passed through the chamber-bottom wall 18 passes through the space between the walls 18-19 for cooling purposes and discharges into the inner volume 21 of the chamber 10 through an annular space located at the periphery of the flame-arresting wall 19.

The combustion chamber 10 also comprises an upstream annular fairing 20 fastened (by bolting for example) to the chamber bottom 18 and intended to direct the air flow FA into, or around, the combustion chamber 10. The chamber-bottom wall 18 and the fairing 20 comprise openings 22, 24 allowing air to enter the chamber and the insertion of the heads of the injectors 26 diffusing fuel into the combustion chamber 10. The downstream end of the inner annular shroud 12 is connected to an annular flange 27 for fastening to an inner housing 28 arranged radially inside the inner annular shroud 26 with respect to the axis 30 of the turbomachine (longitudinal axis and general axis of rotation). The inner annular rim 27 also includes at its radially inner end a radial annular wall 32 bolted to a corresponding radial annular wall 34 of the inner housing 28. Similarly, the downstream end of the outer annular shroud 14 is connected to an annular flange 36 for fastening to an outer housing 38 surrounding the combustion chamber 10. The radially outer end of the outer flange 36 includes a radial annular wall 40 fastened to a corresponding radial annular wall 42 of the outer housing 38. As shown in FIG. 1, the outer housing 38 also comprises a plurality of bosses 44 distributed circumferentially around the axis of the turbomachine (this is the meaning of "circumferential") and each allowing the fastening of a fuel injector 26 whose arm 46 passes through the boss 44. The downstream end, or head, 48 of each injector is housed along the axis 11 in one of the openings 22 of the fairing 20 axially opposite one of the openings 24 of the chamber bottom 18, this for the injection of fuel into the combustion chamber 10. In order to carry out the ignition of the supplied air/fuel mixture, one or more spark plugs 50 are carried by the outer housing 38 and pass through it and the outer annular shroud 14 in such a way that the radially inner end of the spark plug 50 is flush with the inner face of the outer shroud 14.

In the example, the combustion chamber 10 is convergent, i.e. its hot gas ejection axis 11 converges, downstream, towards the axis 30 of the turbomachine.

Furthermore, as also seen in FIG. 2, which is a prior art solution, the chamber bottom 18 includes two coaxial inner 52 and outer 54 annular flanges extending substantially axially. In order to achieve the fastening of the upstream end of the combustion chamber, the outer housing 38 comprises bosses 56 evenly distributed on the outer face of the outer housing 38.

These bosses 56 each comprise an orifice whose axis is radially aligned with the axis of an opening of a tubular boss 58 formed on the outer face of the outer annular rim 54 of the annular wall of the chamber bottom 18. A fastening pin 60 (also known as a "digon plate") engages from the outside of the outer housing 38 in each opening of the boss 56 of the outer housing and comprises a radially inner end screwed onto a corresponding thread of the inner surface of the tubular boss 58. The pin 60 comes into contact with the boss 56 from the outside during the screwing process. The inner end of the fastening pin 60 has a swivel 62. Thus, a swivel connection is established at the level of the outer shroud 14, thus on the combustion chamber side 10, between the pin 60 and the cylindrical surface of the tubular boss 58 in which the swivel 62 is engaged. The inner annular shroud 12 may have indentations in which bolts 16 for fastening the inner annular rim 52 to the inner annular rim 66 of the fairing 22 are engaged.

The outer shroud 14 may also include recesses for the same bolts 16 to fasten outer annular rim 54 to the outer annular rim 68 of the fairing 22.

The fastening achieved by the pins 60 was considered problematic, in the disclosure; see above; see FR3020865B.

Figure 3:
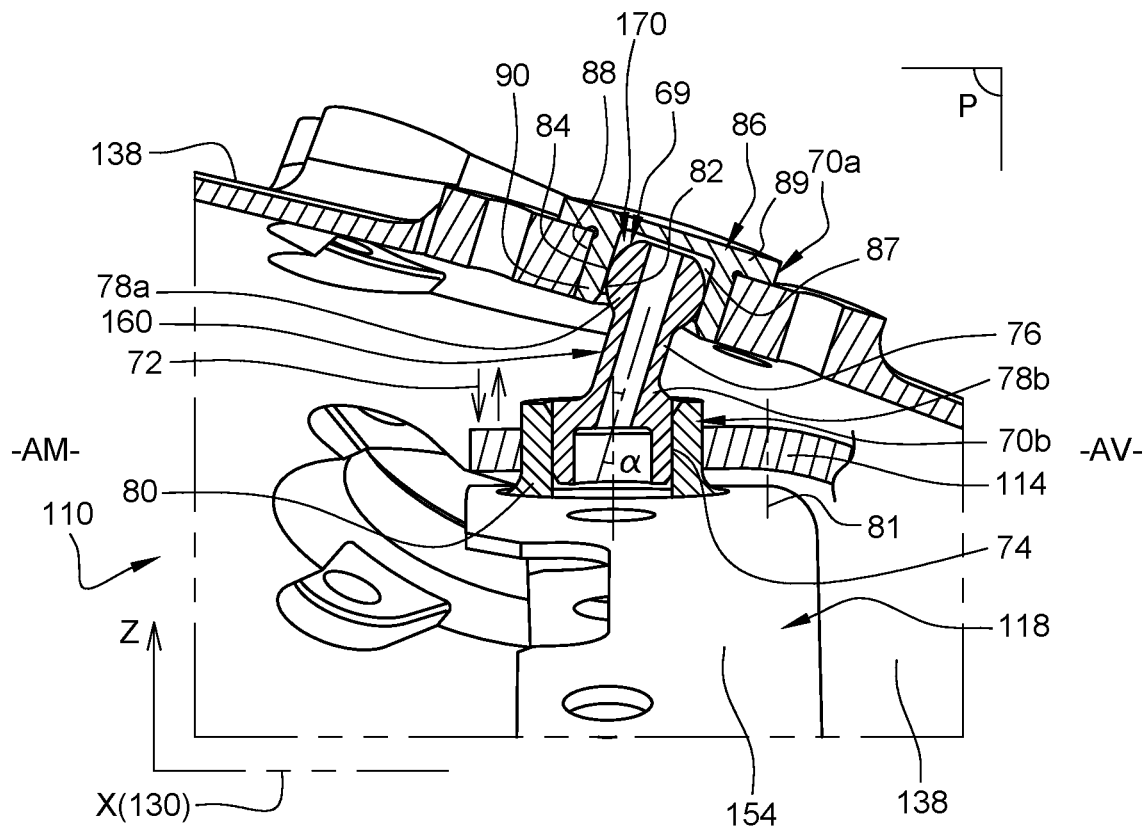
FIG. 3 corresponds, in enlargement, to area III of FIG. 2, but on a combustion chamber according to the disclosure.
Figure 4:
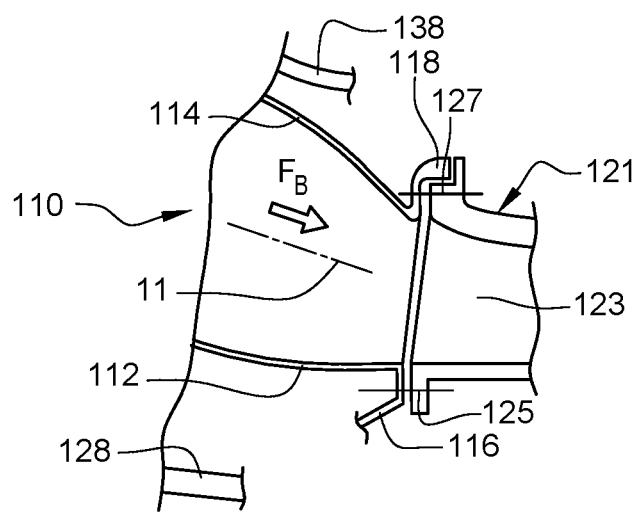
FIG. 4 is a schematic mid-section view like FIG. 1 of another way of attaching a combustion chamber according to the disclosure, at the downstream end.

An embodiment of the solution proposed by the disclosure is illustrated in FIGS. 3-4.

The description made with reference to FIGS. 1, 2 showing a combustion chamber applies, however, to this solution as proposed in FIGS. 3, 4. Similar, or at least functionally identical, items are incremented by one hundred and will not necessarily be described again. It should be noted that the annular combustion chamber 110, of which only the part corresponding to area III of FIG. 2 can be seen in FIG. 3, is still fixed:

in the upstream part, to the outer housing 138, via pins 160 individually to the swivel connection 69 (FIG. 3), and in the downstream part (FIG. 4) to a downstream part of the turbomachine.

In this example, the downstream fastening is carried out via sealing strips 125, 127, between downstream ends of the inner 112 and outer 114 annular rings provided respectively with flanges 116, 118 and other flanges, inner and outer annular respectively, of the nozzle 123, in this case a high pressure nozzle. Springs (not shown) can be used to centre the whole thing. However, the downstream fastening of the combustion chamber 110 could also be done with the inner housing 128 and/or the outer housing 138, as for example according to the solution presented above with reference to FIG. 1.

Regardless of the downstream fastening chosen, it is particularly the upstream fastening of the combustion chamber 110 that is concerned by the disclosure.

Thus, as illustrated in FIG. 3, in the upstream part and per pin 160:

the swivel connection 69 is established between the pin 160 and a hollow part 70a of the outer housing 138, and the pin 160 can further slide radially (arrows 72; Z axis), or with a radial component, by sliding established between the pin 160 and a tubular part 70b of the outer annular shroud 114 and/or the annular wall, or rim, of the bottom of the chamber 118

Part 70a is a fixed, hollow part of the outer housing 138 within the inner cavity 170 of which the swivel connection, or swivel, 69 is received and movable. The swivel connection, or swivel, 69 may be defined by a convex, e.g. spherical, shape at a first end 78a of a shaft 76 present on the (each) pin 160, the possible "sliding connection" then being located at a second end 78b of the shaft 76.

In order to be able to play angularly on the positioning of the chamber 110 for the purpose of controlling clearances (spark plug, fuel injectors, connections to the downstream ends of the shrouds . . . ), it was preferred that:

each pin 160 has a shaft 76 between a first end 78a where the swivel connection 69 is located and a second end 78b where, for the aforementioned possible sliding, the pin is then in sliding contact along an axis with the tubular part 70b, and the shaft 76 is oriented obliquely with respect to the axis of the sliding contact marked 74 FIG. 3: angle α (here to be component on X and Z).

The angle α may be such that 10° a 25° with respect to the local radial axis (Z).

Choosing the radial axis Z as the axis of the sliding contact 74 will allow for ease of manufacture and a positioning reference system that is easier to control and therefore more operational. In this regard, the preferred embodiment provides that the tubular part 70b with which the permitted sliding 74 is established, radially or thus with radial component, comprises a radially erected channel 80.

If the sliding 74 were "radial component", the angle with respect to the Z axis would be less than 45°, and preferably less than 30°, preferably still of a value like the angle α, which could then be equal to 0°, the shaft 76 could then be radial.

By deciding that the channel 80 is erected radially on the bottom wall of the chamber 118, thus a part that can be structural, it will be possible to stabilize the fastening to be made.

The channel 80 may be welded to the wall of the chamber bottom 118, or may be fabricated in one piece with it.

This annular wall of the chamber bottom 118 is defined in the preferred embodiment by the outer annular rim 154.

81, schematically shown in FIG. 3 is one of the radial fasteners, such as radial screws, that exist between the chamber-bottom wall 118 and the outer annular shroud 114 circumferentially.

Thus, whether the tubular part 70b is fixed or integral with the outer annular shroud 114 or with the chamber-bottom wall 154 118, or both, a sliding connection 74 with one will involve a sliding connection with the other.

In addition, it is proposed that the swivel connection 69 comprises a connection between a convex wall 82 and a cylindrical wall 84 which is thus oriented obliquely with respect to the axis of the sliding contact; see FIG. 3.

On the outer housing side 138, the swivel connection 69 is thus formed by the convex wall 82 at the first end 78a of the pin 160 and the cylindrical wall 84 (of a hole 87) of the outer housing 138, or a part attached thereto.

Indeed, it is even provided that this cylindrical wall 84 may be a wall of a plug 86 attached to the outer housing 138, to close an opening 88 where the swivel head, i.e. the convex wall 82, is positioned.

The plug 86 is considered part of the outer housing 138.

Each orifice 87 and the cylindrical wall 84 peripherally bounding it are oriented obliquely (at angle α) with respect to the axis, preferably radial, of the sliding contact.

Figure 5:
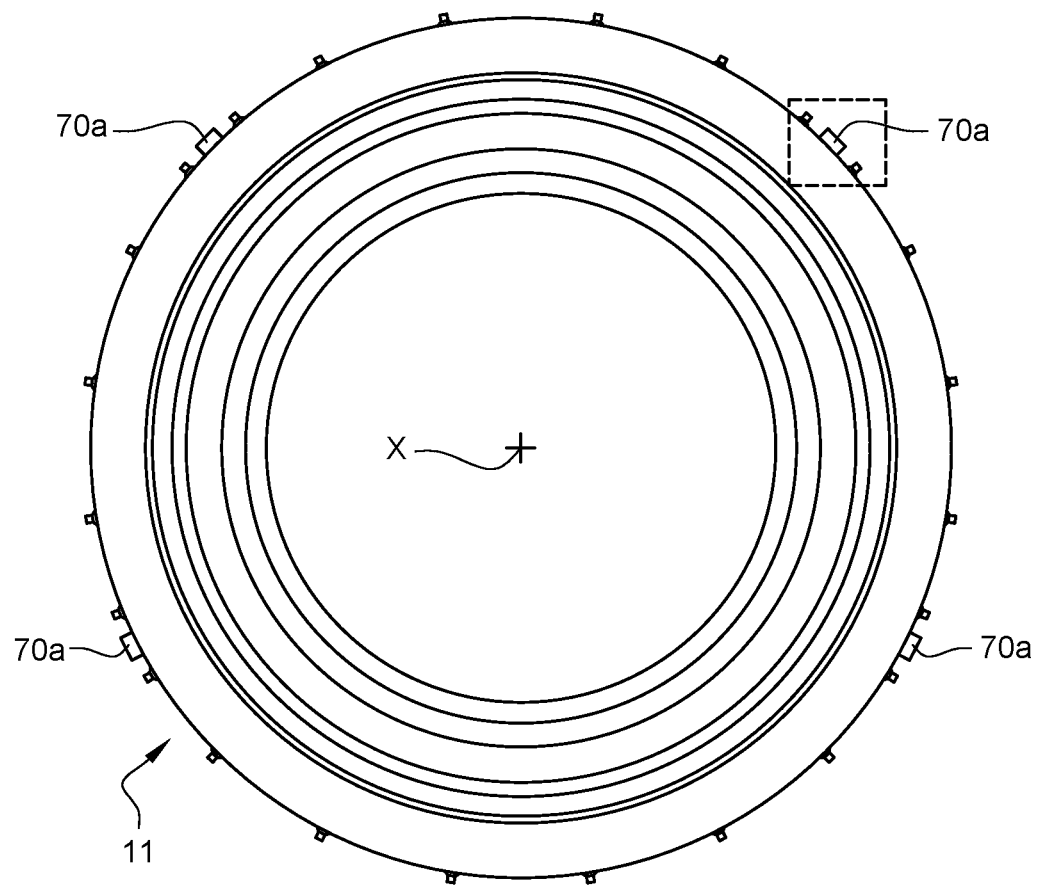
FIG. 5 is a schematic view from downstream in median section like FIG. 1 showing a possible circumferential distribution of the fasteners at the upstream end of the combustion chamber.

The plug 86 has a solid bottom 89 which externally closes the opening 88 of the outer housing 138 and a shaft 90 which penetrates the opening 88, which shaft has the cylindrical wall 84. With the view, from downstream, of the combustion chamber 110 in FIG. 5, it is understood that, preferably, in the upstream part, the pins 160 and the relevant portions of the outer housing 138 (only portions 70a are seen here), are at least three (four in the example) and are circumferentially distributed around the combustion chamber 110.

Each pin 160 may thus, via the swivel connection 69 and the authorised sliding movement 72, have an angular orientation different from that of the other pins, each with respect to a radial axis Z, according to a plane (marked P in FIG. 3) passing through the axis (X, 130) of the turbomachine, thus making it possible to regulate the position and orientation of the combustion chamber 110 as well as possible.

The invention claimed is:

1. An aircraft gas turbomachine having an axis and comprising an outer housing and an annular combustion chamber having a chamber bottom, the annular combustion chamber comprising an inner annular shroud and an outer annular shroud that are radial with respect to the axis of the turbomachine, arranged one inside the other, and connected at upstream ends by an annular wall of the chamber bottom, the annular combustion chamber being fixed, at an upstream part thereof, to the outer housing, via pins individually connected by a swivel connection,
  wherein, at said upstream part of the annular combustion chamber, and for each pin:
    the swivel connection is established between the pin and a part of the outer housing in which a convex wall of the pin is received, and
    a sliding connection is established, spaced from the swivel connection, between the pin and a part of the outer annular shroud and/or the annular wall of the chamber bottom, the sliding connection providing sliding translation of the pin relative to the outer annular shroud and/or the annular wall of the chamber bottom.

2. The turbomachine according to claim 1, wherein said upstream part through which the sliding connection of the pin is established is a tubular part extending radially, or with a radial component.

3. The turbomachine according to claim 2, wherein:
  each pin has a shaft between a first end, where the swivel connection in said outer housing is located, and a second end, the pin is in sliding contact, along an axis, with said tubular part, and
  the shaft is obliquely oriented with respect to the axis of the sliding contact.

4. The turbomachine according to claim 3, wherein the axis of the sliding contact is radial.

5. The turbomachine according to claim 1, wherein said part of the outer annular shroud and/or the annular wall of the chamber bottom comprises a radially erected channel.

6. The turbomachine according to claim 5, wherein the channel is erected radially on the annular wall of the chamber bottom.

7. The turbomachine according to claim 1, wherein the swivel connection comprises a connection between said convex wall and a cylindrical wall.

8. The turbomachine according to claim 7, wherein the cylindrical wall is a wall of a plug attached to the outer housing.

9. The turbomachine according to claim 1, wherein in said upstream part, the pins, which include at least three pins, are distributed circumferentially around the combustion chamber and are adapted, by means of the swivel connection to individually have an angular orientation different from that of the others, each in relation to a radial axis, in a plane passing through the axis of the turbomachine.

\* \* \* \* \*